United States Patent
Ma et al.

(10) Patent No.: US 8,209,442 B2
(45) Date of Patent: Jun. 26, 2012

(54) PERIPHERAL DEVICE COMMUNICATING WITH A SPECIFIC WEBSITE

(75) Inventors: Mou-Ming Ma, Taipei Hsien (TW);
Chun-Kun Lan, Taipei Hsien (TW);
Yih-Neng Lin, Taipei-Hsien (TW);
Chih-I Lee, Taipei Hsien (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 12/917,282

(22) Filed: Nov. 1, 2010

(65) Prior Publication Data
US 2012/0089752 A1 Apr. 12, 2012

(51) Int. Cl.
*G06F 3/00* (2006.01)
*G06F 17/00* (2006.01)
(52) U.S. Cl. ............ 710/15; 715/205; 715/206
(58) Field of Classification Search ............ 710/1, 15, 710/16; 715/205–208
See application file for complete search history.

(56) References Cited

U.S. PATENT DOCUMENTS

2002/0099784 A1* 7/2002 Tran .................. 709/212
2011/0051703 A1* 3/2011 Fulknier et al. ............ 370/338

OTHER PUBLICATIONS

Novatel Wireless; MiFi 2200 Mobile Hotspot Browser Interface; 2009; www.sprint.com; p. 1-52.*

* cited by examiner

*Primary Examiner* — Richard B Franklin
(74) *Attorney, Agent, or Firm* — Chun-Ming Shih

(57) ABSTRACT

A peripheral device with a wireless communication function including a transmitting interface, a wireless communication unit, a storage unit and a processing unit is disclosed. The transmitting interface is connected to a computer system including a display device. The wireless communication unit utilizes a wireless method to link to an internet. The storage unit has at least one connection information. The processing unit directs the display device to display a list according to the connection information when the transmitting interface connects to the computer system. The list includes at least one choice. When the at least one choice is selected, the display device displays a homepage of a specific website.

14 Claims, 3 Drawing Sheets

PERIPHERAL DEVICE COMMUNICATING WITH A SPECIFIC WEBSITE

BACKGROUND OF THE INVENTION

1. Field of the Invention

The invention relates to a peripheral device, and more particularly to a peripheral device with a wireless communication function.

2. Description of the Related Art

With technological development, more and more storage mediums have been developed. The different types of the storage mediums include a hard-disk type, a travel disk type and an optical disk type. A user typically carries one storage medium. However, all storage mediums have fixed capacity. When one storage medium is filled, the storage medium cannot store additional data.

Further, if a user desires to access specific data from a computer system, the specific data is first required to be stored in a storage medium and then the storage medium is connected to the computer system. Thus, in such a case, access is not possible if the user forgets to carry the storage medium or the storage medium is faulty.

BRIEF SUMMARY OF THE INVENTION

In accordance with an embodiment, a peripheral device with a wireless communication function comprises a transmitting interface, a wireless communication unit, a storage unit and a processing unit. The transmitting interface is connected a computer system comprising a display device. The wireless communication unit utilizes a wireless method to link to an internet. The storage unit has at least one connection information. The processing unit directs the display device to display a list according to the connection information when the transmitting interface connects to the computer system. The list comprises at least one choice. When the at least one choice is selected, the display device displays a homepage of a specific website.

In accordance with a further embodiment, an operating method for a peripheral device is described in the following. The peripheral device is directed to connect to a computer system. A list is displayed according to connection information stored in the peripheral device. The list comprises at least one choice. When the at least one choice is selected, a homepage of a specific website corresponding to the selected choice is accessed.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising" when used in this specification, specify the presence of stated features, integer steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
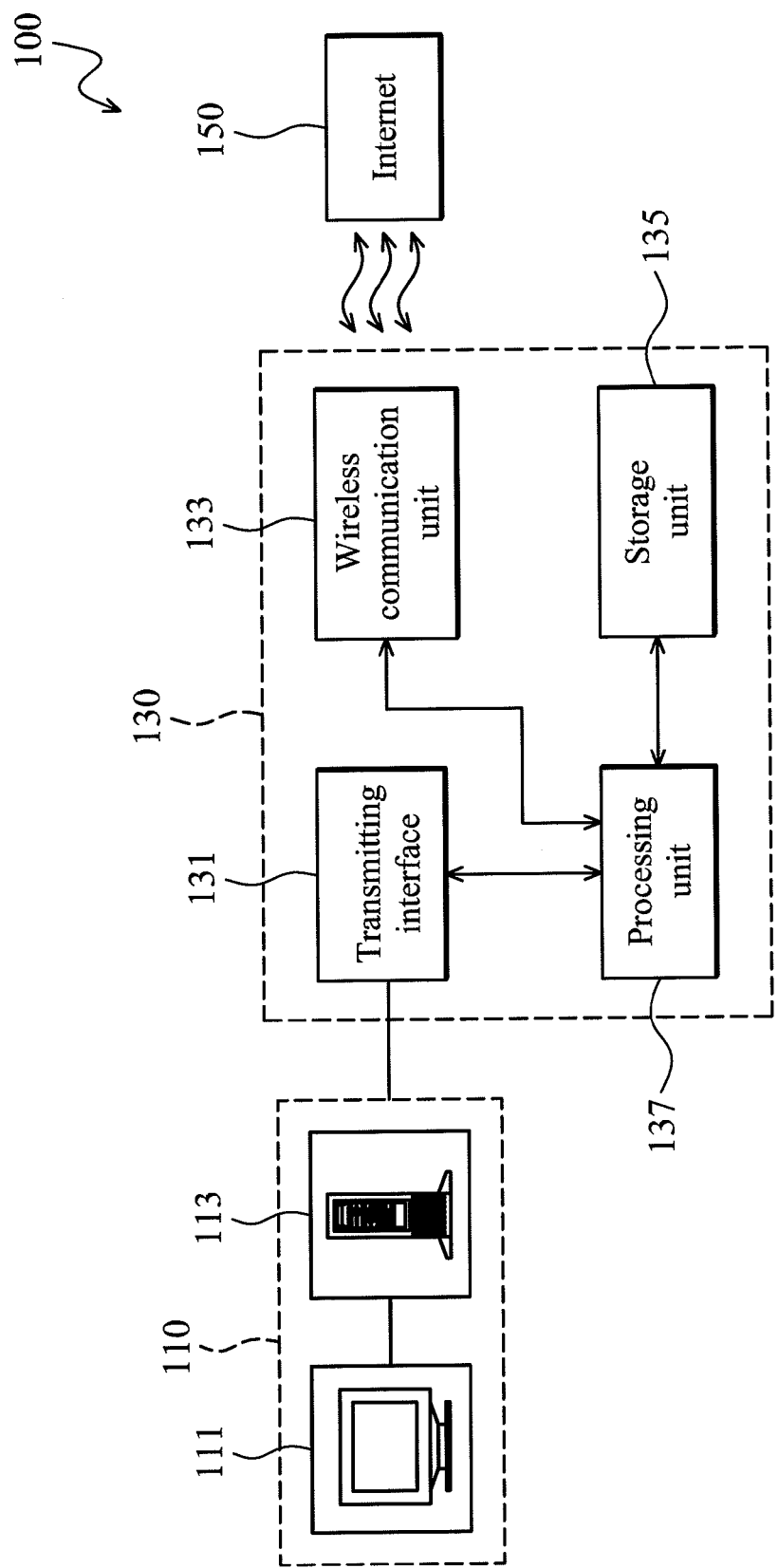
FIG. 1 is a schematic diagram of an exemplary embodiment of a processing system.

FIG. 1 is a schematic diagram of an exemplary embodiment of a processing system of the invention. The processing system 100 comprises a computer system 110, a peripheral device 130 and an internet 150. The peripheral device 130 is coupled between the computer system 110 and the internet 150. The invention does not limit the type of connection between the computer system 110, the peripheral device 130 and the internet 150. In one embodiment, the peripheral device 130 utilizes a wired method or a wireless method to connect to the computer system 110 and the internet 150.

The computer system 110 comprises a display device 111 and a host 113. The invention does not limit the type of the computer system 110. In one embodiment, the computer system 110 is a desktop computer. In another embodiment, the computer system 110 is a notebook computer. The operation of the computer system is well known to those skilled in the art, thus, description thereof is omitted.

The peripheral device 130 has a wireless communication function and comprises a transmitting interface 131, a wireless communication unit 133, a storage unit 135 and a processing unit 137. When the transmitting interface 131 is connected to the computer system 110, the peripheral device 130 is capable of communicating with the computer system 110. The invention does not limit the type of the transmitting interface 131. In one embodiment, the transmitting interface 131 utilizes a wired method to connect to the computer system 110. The wired method may relate to a universal serial bus (USB) device or a peripheral component interconnect express (PCI-E) device. In another embodiment, the transmitting interface 131 utilizes a wireless method to connect to the computer system 110. The wireless method may relate to a blue tooth device.

The wireless communication unit 133 utilizes a wireless method to communicate with the internet 150. The invention does not limit the type of the wireless communication unit 133. In one embodiment, the wireless communication unit 133 relates to a 3G (3rd-generation) communication system. In other embodiments, the wireless communication unit 133 relates to a 3.5G communication system, a 4G communication system or a worldwide interoperability for microwave access (WiMAX) system.

The storage unit 135 comprises one or more connection information. The invention does not limit the type of the storage unit 135. In one embodiment, the storage unit 135 is a flash memory or a double data rate synchronous dynamic random access memory (DDR SDRAM). In this embodiment, the connection information stored in the storage unit 135 comprises an address of a specific website, an ID, a password or other information, wherein the ID and the password are utilized to access the specific website.

When the transmitting interface 131 connects to the computer system 110, the processing unit 137, based on the connection information stored in the storage unit 135, directs the display device 111, such that the display device 111 displays a list. In this embodiment, the displayed list has at least one choice. The choice corresponds to a specific website. When the choice is selected, the display device 111 displays a homepage of the specific website corresponding to the selected choice.

Figure 2:
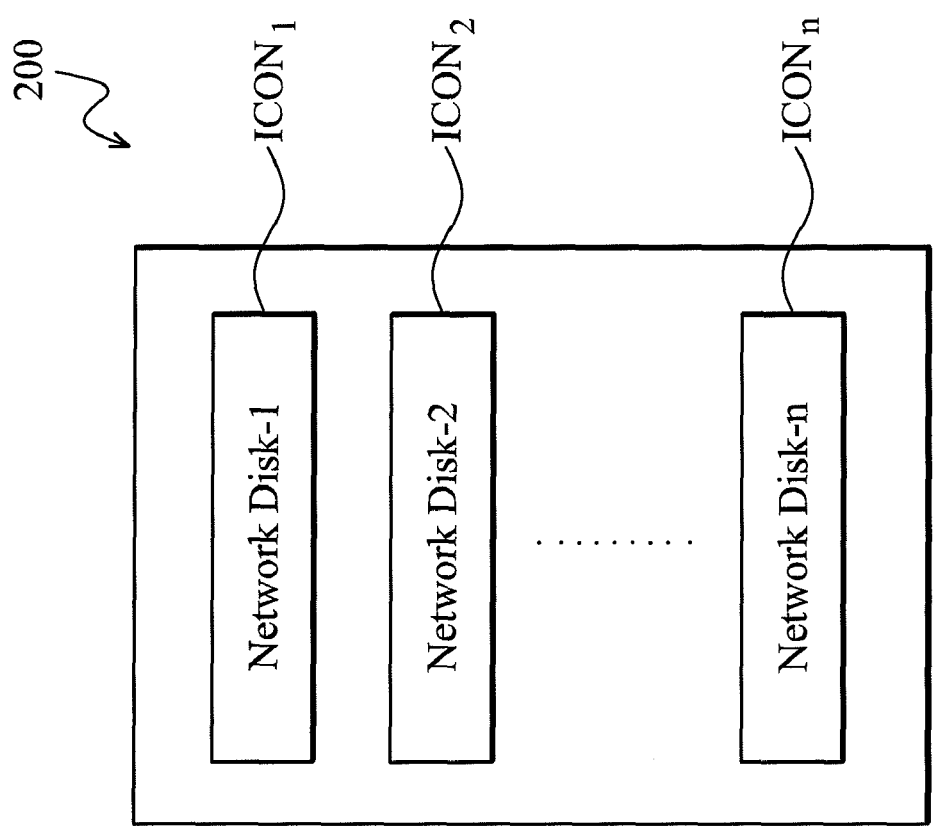
FIG. 2 is a schematic diagram of an exemplary embodiment of a list.

FIG. 2 is a schematic diagram of an exemplary embodiment of a list. The list 200 comprises choices $ICON_1 \sim ICON_n$. The invention does not limit the pattern of the choices $ICON_1 \sim ICON_n$. In one embodiment, the patterns of the choices $ICON_1 \sim ICON_n$ are text, as shown in FIG. 2. In one embodiment, the patterns of the choices $ICON_1 \sim ICON_n$ are icons.

Each of the choices $ICON_1 \sim ICON_n$ corresponds to a homepage of a specific website. When a user selects one of the choices $ICON_1 \sim ICON_n$, a corresponding website is accessed and the display device 111 displays a homepage of the corresponding website. For example, assuming the choices $ICON_1 \sim ICON_n$ respectively represent network disks 1~n. If a user selects the choice $ICON_1$, the display device 111 displays a homepage of a specific website corresponding to the selected choice $ICON_1$ and the user accesses the homepage to utilize the network disk-1. The network disk-1 may be provided by Google. If the user selects the choice $ICON_2$, the display device 111 displays another homepage of another specific website corresponding to the selected choice $ICON_2$ and the user accesses the homepage to utilize the network disk-2. The network disk-2 may be provided by Microsoft.

Therefore, only the user stores addresses of all network disks, IDs, passwords into the storage unit 135 such that the processing unit 137 is capable of directing the wireless communication unit 133 to automatically link to the corresponding website. Furthermore, the corresponding ID and password can be automatically loaded. Thus, the user is not required to input a specific address, a corresponding ID and a corresponding password if the user desires to link to a specific website. In addition to increase convenience, the peripheral device 130 finishes a plurality of linking paths such that the user can access data between multiple network disks. Since the number of network disks is numerous, the user is not required to consider remaining capacity of the network disks. Furthermore, since data is stored in the network disks, the consistency and the security of the data are manageable.

The invention does not limit the type of the homepages. In this embodiment, the choices $ICON_1 \sim ICON_n$ respectively represent different network disks, wherein the different network disks correspond to different homepages. In other embodiments, the choices $ICON_1 \sim ICON_n$ respectively represent different remote servers.

In one embodiment, a choice does not have to be selected, for the wireless communication unit 133 to automatically link to all corresponding homepages of all choices $ICON_1 \sim ICON_n$ according to the connection information when the peripheral device 130 connects to the computer system 110. At this time, the display device 111 displays a list comprising a multitude of choices. After a choice is selected, the display device 111 displays a homepage corresponding to the selected choice. In this case, the wireless communication unit 133 still links to the other homepages.

In another embodiment, the wireless communication unit 133 links to a corresponding homepage after a choice is selected. In this case, after a user selects one choice, the wireless communication unit 133 links to one homepage corresponding to the selected choice. At this time, the wireless communication unit 133 does not link to the other homepages corresponding to the un-selected choices.

In other embodiments, the storage unit 135 further comprises identification information to increase security. When the transmitting interface 131 connects to the computer system 110, the processing unit 137 compares input information provided by the computer system 110 with the identification information stored in the storage unit 135. The processing unit 137 determines whether to direct the display device 111 to display a list according to the compared result.

For example, when the input information matches the identification information, the display device 111 displays a list. Contrarily, when the input information does not match the identification information, the display device 111 does not display the list. The invention does not limit the type of the identification information. In one embodiment, the identification information is a fingerprint or a human face. Compared with a conventional traveling disk, the comparison required, between the input information and the identification information, can increase security.

Figure 3:
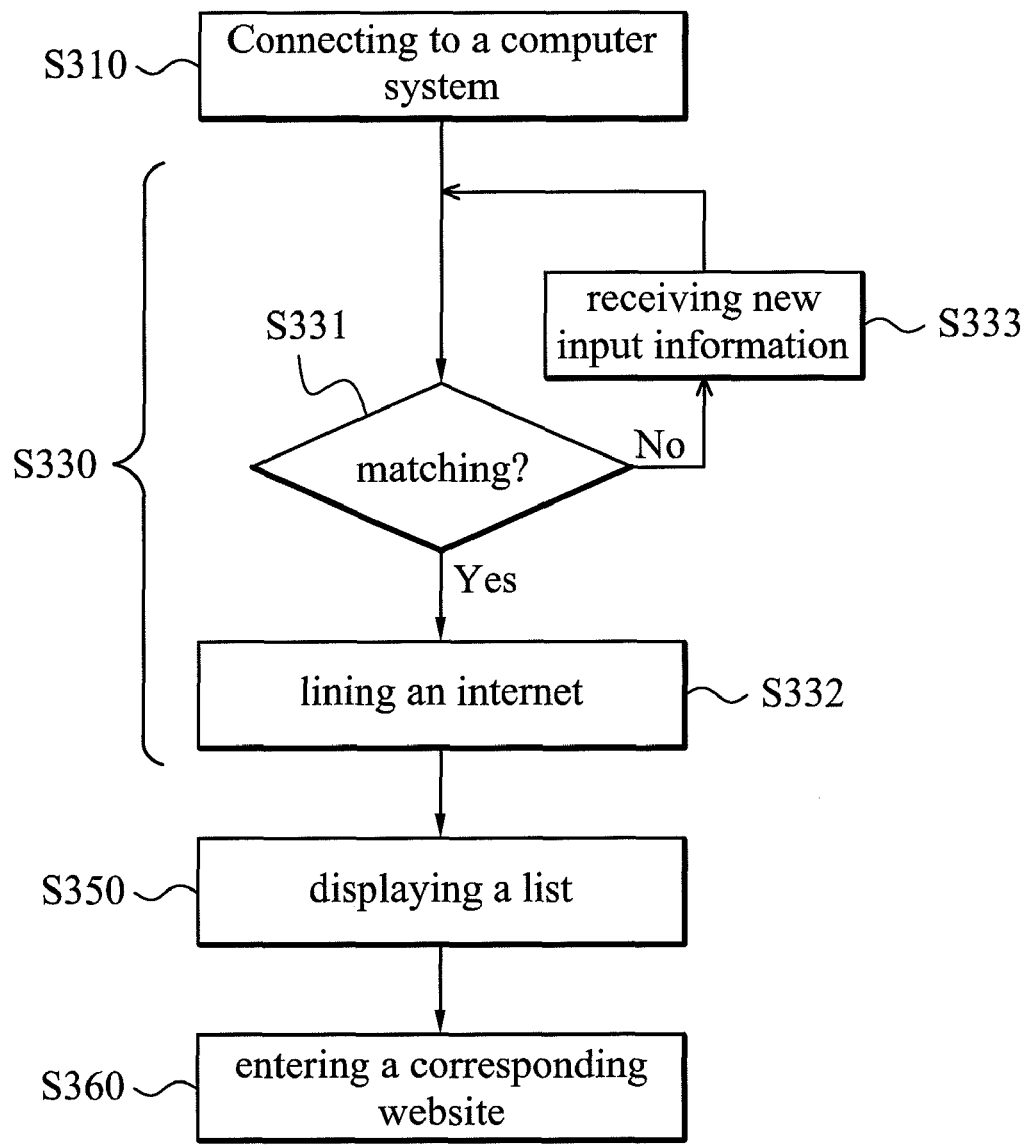
FIG. 3 is a schematic diagram of an exemplary embodiment of an operating method.

FIG. 3 is a schematic diagram of an exemplary embodiment of an operating method of the invention. The operating method is applied for a peripheral device. First, the peripheral device is directed to connect to a computer system (step S310). The invention does not limit the type of the connection between the peripheral device and the computer system. In one embodiment, the peripheral device utilizes a wired method or a wireless method to connect to the computer system. Additionally, the invention does not limit the type of the computer system. In one embodiment, the computer system is a desktop computer or a notebook computer.

An identification action is executed (step S330). In other embodiments, step S330 can be omitted. If step S330 is omitted, when step S310 is finished, step S350 is then executed. One identification action is described in the following, but the disclosure it not limited thereto.

Input information is compared to identification information (step S331). In one embodiment, a user inputs the input information to the computer system. The input information received by the computer system is compared with the identification information. The invention does not limit the type of the identification information. In one embodiment, the identification information can be a fingerprint or a human face. If the input information does not match the identification information, new input information is received (step S333) until the input information matches the identification information. If the input information matches the identification information, a link is established to the internet (step S332).

In step S332, the link to the internet is according to connection information stored in the peripheral device. In one embodiment, when the internet is linked, the peripheral device automatically links to at least one specific website according to the connection information. In another embodiment, the peripheral device does not link to the specific websites provisional. Further, the invention does not limit the number of linking of specific websites. In one embodiment, the peripheral device links to a multitude of websites.

A list is displayed according to the connection information stored in the peripheral device (step S350). In one embodiment, the list comprises at least one choice. Each choice corresponds to a specific website. The invention does not limit the type of the website. In one embodiment, different choices represent different network disks. In other embodiments, step S350 does not only provide a list, but also a function to link to the internet. In one embodiment, before selecting a choice, the peripheral device does not link to the websites. After a user selects one choice, the peripheral device links to a specific website corresponding to the selected choice.

After selecting a choice, a corresponding website is accessed and a corresponding homepage is displayed (step S360). Taking FIG. 2 as an example, if the choice $ICON_1$ is selected, a corresponding homepage is displayed. If the choice $ICON_2$ is selected, another corresponding homepage is displayed. Thus, when the peripheral device stores connection information, the connection information can be employed to automatically link to a multitude of specific websites and automatically load the corresponding ID and password, for the convenience of users of peripheral devices, to increase usage thereof.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A peripheral device with a wireless communication function, comprising:
   a transmitting interface for connecting to a computer system comprising a display device;
   a wireless communication unit utilizing a wireless method to link to internet;
   a storage unit having at least one connection information; and
   a processing unit directing the display device to display a list according to the connection information when the transmitting interface connects to the computer system, wherein the list comprises at least one choice, and when the at least one choice is selected, the display device displays a homepage of a specific website, wherein the connection information comprises an address of the specific website, an ID and a password.

2. The peripheral device as claimed in claim 1, wherein the transmitting interface relates to a universal serial bus (USB) device, a blue tooth device or a peripheral component interconnect express (PCI-E) device.

3. The peripheral device as claimed in claim 1, wherein the wireless communication unit is a 3 G (3 rd-generation) communication system, a 3.5 G communication system, a 4 G communication system or a worldwide interoperability for microwave access (WiMAX) system.

4. The peripheral device as claimed in claim 1, wherein the storage unit further comprises an identification information, wherein when the transmitting interface connects to the computer system, the processing unit compares an input information and the identification information, and when the input information matches the identification information, the display device is directed to display the list.

5. The peripheral device as claimed in claim 4, wherein the input information is a fingerprint or a human face.

6. The peripheral device as claimed in claim 1, wherein when the at least one choice is selected, the wireless communication unit communicates with the specific website, and when the at least one choice is not selected, the communication unit does not communicate with the specific website.

7. The peripheral device as claimed in claim 1, wherein when the transmitting interface connects to the computer system, the processing unit directs the wireless communication unit to communicate with the specific website.

8. The peripheral device as claimed in claim 1, wherein when the storage unit comprises a plurality of connection information, the list comprises a plurality of choices and when one choice is selected, the display device displays the homepage of the specific website corresponding to the selected choice.

9. The peripheral device as claimed in claim 8, wherein when the transmitting interface connects to the computer system, the processing unit directs the wireless communication unit to communicate with a plurality of specific website according to the connection information, and when a first choice among the choices is selected, the display device displays the homepage of the specific website corresponding to the first choice, and when a second choice among the choices is selected, the display device displays the homepage of the specific website corresponding to the second choice.

10. An operating method for a peripheral device, comprising:
    directing the peripheral device to connect to a computer system;
    displaying a list according to a connection information stored in the peripheral device, wherein the list comprises at least one choice; and
    when the at least one choice is selected, a homepage of a specific website corresponding to the selected choice is accessed, wherein the connection information comprises an address of the specific website, an ID and a password.

11. The operating method as claimed in claim 10, further comprising:
    receiving an input information;
    comparing the input information with an identification information;
    when the input information matches the identification information, the list is displayed; and
    when the input information does not match the identification information, the list is not displayed.

12. The operating method as claimed in claim 10, further comprising:
    communicating with the specific website according to the connection information.

13. The operating method as claimed in claim 10, wherein the connection between the peripheral device and the computer system relates to a universal serial bus (USB) device, a blue tooth device or a peripheral component interconnect express (PCI-E) device.

14. The operating method as claimed in claim 10, wherein a 3 G (3 rd-generation) communication system, a 3.5 G communication system, a 4 G communication system or a worldwide interoperability for microwave access (WiMAX) system is utilized to communicate with the specific website.

* * * * *